United States Patent
Horwath et al.

(10) Patent No.: US 6,450,285 B1
(45) Date of Patent: Sep. 17, 2002

(54) STEERING DEVICE

(75) Inventors: Jochen Horwath, Unterensingen; Ralf Kaufmann, Walldurn; Hans-Christian Pflug, Remshalden, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/646,427

(22) PCT Filed: Apr. 1, 1999

(86) PCT No.: PCT/EP99/02285

§ 371 (c)(1),
(2), (4) Date: Oct. 23, 2000

(87) PCT Pub. No.: WO99/57001

PCT Pub. Date: Nov. 11, 1999

(30) Foreign Application Priority Data

Apr. 30, 1998 (DE) ......................................... 198 19 404

(51) Int. Cl.[7] ............................................... B62D 5/00
(52) U.S. Cl. ....................... 180/404; 180/410; 280/81.6
(58) Field of Search ............................... 180/404, 405, 180/406, 417, 421, 422, 410; 280/81.6

(56) References Cited

U.S. PATENT DOCUMENTS

| 4,591,177 A | | 5/1986 | Perlini | |
|---|---|---|---|---|
| 5,101,922 A | * | 4/1992 | Ohmura | .................... 180/79.1 |
| 5,257,191 A | * | 10/1993 | Takehara et al. | ....... 364/424.05 |
| 5,554,969 A | * | 9/1996 | Eguchi | ....................... 340/438 |
| 5,584,226 A | | 12/1996 | Roemer et al. | |
| 5,862,878 A | * | 1/1999 | Bohner et al. | .............. 180/403 |
| 5,941,334 A | * | 8/1999 | Inagaki | ....................... 180/242 |

FOREIGN PATENT DOCUMENTS

| EP | 0 577 571 | 1/1994 |
|---|---|---|
| WO | 97/26170 | 7/1997 |

* cited by examiner

*Primary Examiner*—Kenneth R. Rice
*Assistant Examiner*—Christopher Buchanan
(74) *Attorney, Agent, or Firm*—Kenyon & Kenyon

(57) ABSTRACT

A steering device for steering the wheels of a steering axle of a motor vehicle having at least three axles. The steering axle is designed as a trailing or leading axle, with a hydraulic arrangement which has an actuating assembly for the steering actuation of the wheels, and a regulating/control valve for pressure to act upon hydraulic connections of the actuating assembly and a clearing valve, by means of which the steering device can be changed over between normal operation and emergency operation. In the emergency operation, the hydraulic connections of the actuating assembly are connected to one another. Four throttle elements are provided. The first is arranged upstream and the second downstream of a connection point of the clearing valve to a first hydraulic line connecting the regulating/ control valve and actuating assembly. The third is arranged upstream and the fourth downstream of a connection point of the clearing valve to a second hydraulic line connecting the regulating/ control valve and actuating assembly.

12 Claims, 2 Drawing Sheets

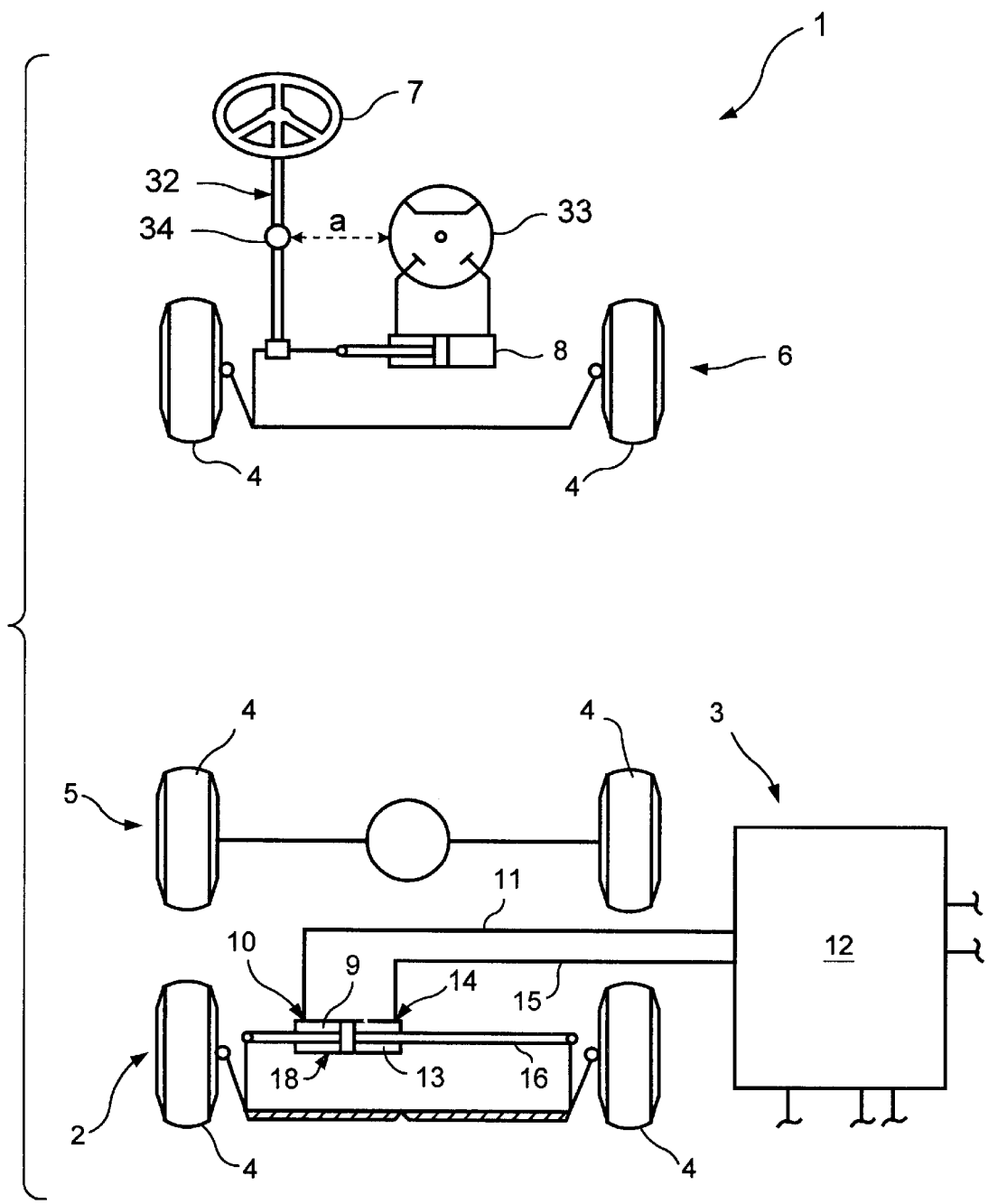
F I G. 1

STEERING DEVICE

BACKGROUND OF THE INVENTION

1. Field of the Invention

The invention relates to a steering device for steering the wheels of a steering axle of a motor vehicle having at least three axles, with the steering axle being designed as a trailing or leading axle.

2. Description of the Prior Development

In order to improve the driving behavior, for example in terms of manoeuvrability and tire wear, in a motor vehicle, particularly in a commercial vehicle or heavy-goods vehicle, with more than two axles, at least one rigid axle designed as a trailing or leading axle and having non-steerable wheels is replaced by a steering axle having steerable wheels. To steer the wheels of this trailing or leading axle, the vehicle is equipped with a steering device which is designated as additional steering. In this case, the hydraulics and electronics of the steering device cause these wheels to be steered as a function of the steering movements triggered by the driver, with the geometric arrangement of these wheels on the vehicle being taken into account.

In the event that such additional steering has malfunctions, advanced additional steerings of this type can change-over from normal operation with a fully functionable steering device to emergency operation, so that, in particular, the safety of the vehicle can be ensured. In this context, two different safety concepts have emerged in practice. According to one safety concept, the wheels steerable by means of the additional steering are locked in their instantaneous position, in which they are located at the moment of changeover to emergency operation. Alternatively, the wheels can be moved back by means of corresponding additional elements into a centered middle position assigned to the straight-line travel of the motor vehicle and only then are locked in this position. In the last-mentioned case, in emergency operation the wheels of the steering axle which are steerable per se function in the same way as non-steerable wheels of a rigid axle.

According to the other safety concept, the wheels of the steering axle which are steered by the steering device are cleared hydraulically in emergency operation, the mounting of the wheels or the design of the steering axle being such that these wheels, utilizing a castor effect, function in a self-tracking manner, at least when the vehicle is travelling forwards. In this case, the carrying capacity of the wheels is not impaired, but they can no longer transmit lateral guidance forces to the motor vehicle. The present invention relates to a steering device for wheels of this type, which are self-tracking in emergency operation.

SUMMARY OF THE INVENTION

To implement the hydraulic clearance of the steered wheels in emergency operation, a hydraulic arrangement has a clearing valve which is capable of being actuated by an electronic arrangement and by means of which the hydraulic connections of the actuating assembly are short-circuited in emergency operation, with result that the same hydraulic pressure prevails at both hydraulic connections and free fluid exchange is possible between these.

The present invention is concerned with the problem of improving a steering device of the type mentioned above, to the effect that vehicle safety is increased.

This problem is solved, according to the invention.

The arrangement of throttle elements, which is proposed according to the invention, gives rise to the situation where, in emergency operation, that is to say when the hydraulic connections of the actuating assembly communicate with one another hydraulically via the clearing valve, an exchange of hydraulic medium between these hydraulic connections can take place only in a throttled manner. When, for example, the vehicle travels on one side over an obstacle or unevenness in the ground, in the case of a conventional steering device the lateral forces occurring at the same time and acting on the cleared, that is to say laterally freely movable, wheels can bring about a brief deflection of the respective wheels, which may lead to an unsteady castor, in particular to wobbling of the respective cleared wheels. In contrast to this, in the steering device according to the invention, a steering movement of the cleared wheels which is generated by external forces is damped, since the fluid exchange between the hydraulic connections of the actuating assembly takes place in a throttled manner. By virtue of this measure, the cleared wheels have considerably improved caster properties and thereby contribute to increased vehicle safety in emergency operation.

Moreover, the measures proposed according to the invention afford an improvement in vehicle safety in normal operation. This is because, in known steering devices, the regulating/control valve is usually designed as a proportional valve which, depending on modulation or activation, transmits the operating pressure of a pressure generator connected to one of the connections of the proportional valve, more or less throttled, to one or other connection of the hydraulic actuating assembly. So that a sufficiently high actuating force and actuating speed can be ensured for the actuating assembly when the vehicle has a maximum load, the proportional valve is equipped with passage cross sections sufficiently large for these instances or throttle resistances sufficiently small for these instances. For the predominant majority of operating situations, however, only markedly lower actuating forces and/or actuating speeds have to be implemented by means of the hydraulic actuating assembly, so that, in these cases, the proportional valve has to be modulated or activated with small opening cross sections or with high throttle resistances within a small range only. However, this reduced modulation at the same time signifies considerably restricted resolution. That is to say the setting, made by the proportional valve, of the actuating speed and actuating travel and therefore of the steering speed and steering angle of the respective wheels can be set and regulated only relatively approximately. Tests have shown that the proportional valves designed for a maximum vehicle load and maximum steering speeds are, in practice, modulated only up to about 20% in the predominant majority of operating situations which arise.

With the aid of the throttles arranged according to the invention, however, it is possible, in order to implement the desired movements of the actuating member, to open the proportional valve further or to modulate it within a considerably wider range, since, to implement the same actuating speeds, the proportional valve must be opened or modulated to a greater extent because of the throttle resistances arranged in the hydraulic lines. The desired movement of the actuating member can therefore be controlled with greater resolution and consequently more accurately in terms of speed and travel.

In a preferred embodiment, the hydraulic arrangement may be designed as a closed-center arrangement in which the regulating/control valve shuts off a regulating/control valve connection connected to a pressure source, as long as there is no control deviation detected between the desired and the actual steering angle. This measure ensures that, when the vehicle is travelling in a straight line, in normal operation the steerable wheels are blocked hydraulically and have particularly good straight-line running properties.

Preferably, an embodiment of this type with a closed-center arrangement has a pressure accumulator, which is fed by the hydraulic pump according to requirements. An arrangement of this type has proved particularly effective in practice, since, for example, a considerably smaller hydraulic pump can be used.

However, in conventional steering devices, the advantages of a closed-center arrangement with a pressure accumulator may have an adverse effect on the additional steering in an emergency. For example, the regulating/control valve may, as it happens, be blocked by a malfunction in just such a position in which the pressure accumulator is connected to one of the hydraulic connections of the actuating assembly. Even when the electronics of the steering device switch off the hydraulic pump immediately, there are flows of hydraulic medium for at least a short time since the pressure accumulator expands due to the (partially) open regulating/control valve. Although the hydraulic connections of the actuating assembly are short-circuited by the clearing valve, during this discharge of the pressure accumulator a pressure difference may be formed at the connections of the clearing valve on account of the throttle losses at the regulating/control valve and at the clearing valve, this pressure difference being transmitted to the hydraulic connections of the actuating assembly and, in spite of clearance, generating at the latter an actuating force and therefore a steering force on the respective wheel. A brief deflection during changeover to emergency operation may thereby occur due to the discharge of the pressure accumulator, and, in conventional additional steerings this may lead to driving situations which cause problems.

In contrast to this, in the steering device according to the invention, because of the proposed arrangement of throttle elements the discharge of the pressure accumulator is throttled by these throttle elements. As a result, the flow velocities are reduced and, consequently, the throttle effects during flow through the regulating/control valve and the clearing valve are reduced. The differential pressure which builds up between the connections of the clearing valve is thereby considerably lower and, moreover, again because of the throttle elements, can spread to the connections of the actuating assembly in a throttle manner only.

The measures proposed according to the invention can thus improve vehicle safety in many respects.

BRIEF DESCRIPTION OF THE DRAWINGS

Further important features and advantages of the steering device according to the invention may be gathered from the drawings and from the following description of a preferred exemplary embodiment with reference to the drawings in which, in each case diagrammatically, FIG. 1 shows a basic diagram of a three-axle motor vehicle, in which a rear axle is equipped with the steering device according to the invention.

DETAILED DESCRIPTION OF THE PREFERRED EMBODIMENTS

Figure 2:
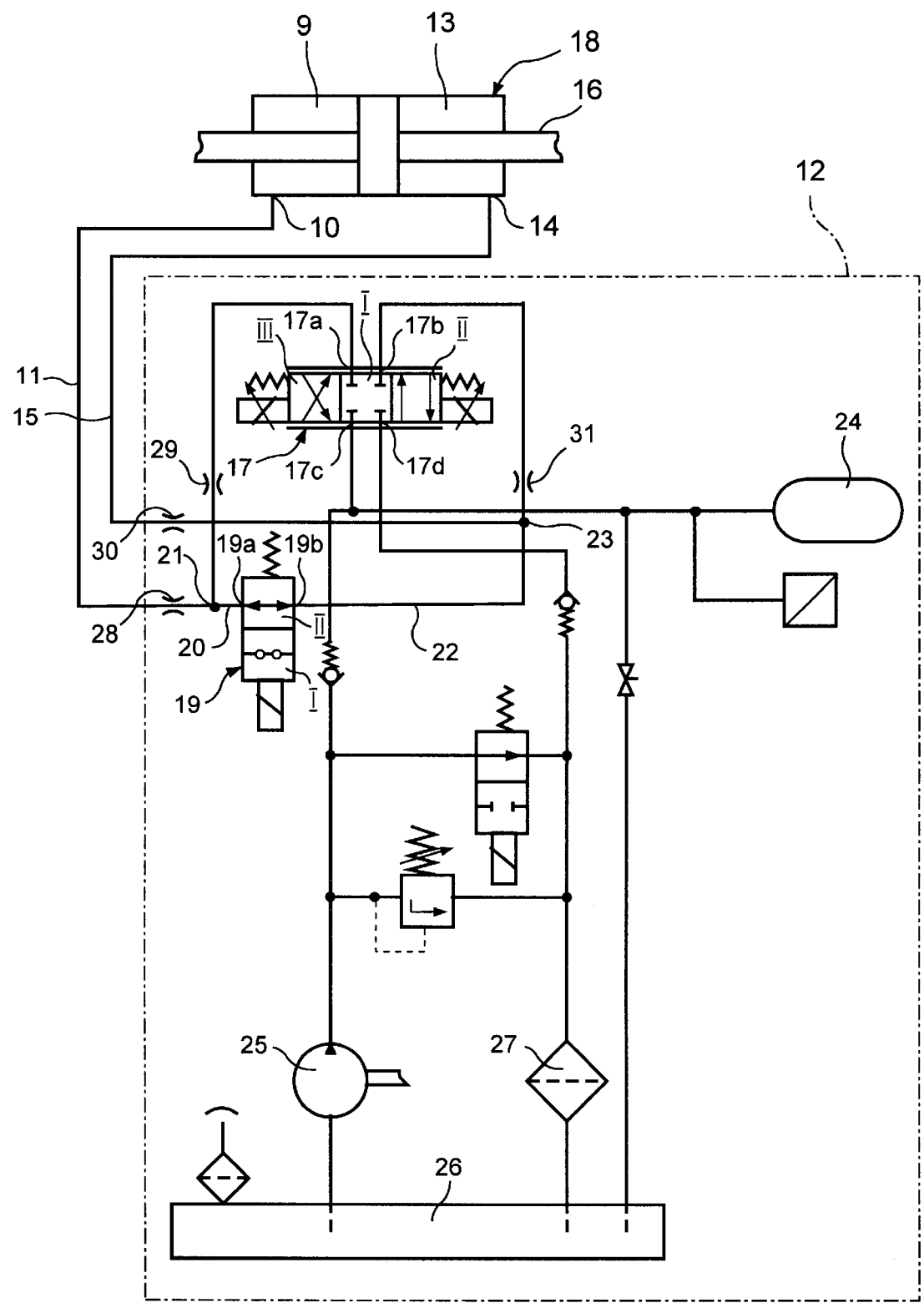
FIG. 2 shows a basic circuit diagram of a hydraulic arrangement of the steering device according to the invention.

According to FIG. 1, a three-axle motor vehicle 1, otherwise not illustrated, is equipped with a steering device 3 according to the invention on its rearmost axle 2 in the direction of travel, at the bottom in FIG. 1, which is designated below as the steering axle 2. By means of this additional steering 3 at the steering axle 2 of the motor vehicle 1, its cornering ability is improved considerably. For example, the skew on the wheels 4 of the steering axle 2 and of a rear axle 5 arranged in front of it and provided with non-steered wheels 4, and therefore their abrasion, are reduced considerably.

Moreover, the manoeuvrability of the vehicle is considerably improved.

The steering movements of the wheels 4 of a front axle 6 are correlated directly with the steering movements of a steering handwheel 7 via positive mechanical coupling by means of a steering train 32, conventional hydraulic steering assistance (power steering) being symbolized by a piston/cylinder assembly 8. In this case, as a rule a servovalve 33 of the power steering is activated as a function of the forces or moments between the wheels 4 and the steering handwheel 7 which occur in the steering train 32 and can be detected, for example, via a torsion element 34 or the like. This operative connection between the steering train 32 and servovalve 33 is symbolized by a dashed double arrow a In contrast to this, the steering of the wheels 4 of the steered rear axle 2 is carried out via the hydraulic arrangement illustrated in FIG. 2, in conjunction with an electronic arrangement which is not illustrated. The steering movements of the wheels 4 of the steering axle 2 which are caused by the electronic arrangement are correlated indirectly with the steering movements of the steering handwheel 7. In this case, the electronic arrangement controls the steering movements of the wheels 4 of the steered rear axle 2 in a correspondingly adapted way, in particular, in the case of a trailing axle, in opposition to the steering movements of the wheels 4 of the front axle 6. Driving situations may also arise, however, in which the front axle 6 is steered and the steerable rear axle 2 is centered in a straight-line position. This may occur, for example, at high travelling speeds or after a centering switch has been actuated.

For the steering actuation of the wheels 4 of the steering axle 2, a hydraulic actuating assembly is provided, which is illustrated symbolically as a piston/cylinder assembly 18. The actuating assembly 18 is of double-acting and hydrostatic design. That is to say, on the one hand, an actuator 16 of the actuating assembly 18 is capable of being driven in two opposite actuating directions ("double-acting") depending on how pressure acts upon two hydraulic connections 10 and 14 of the actuating assembly 18. On the other hand, the actuator 16 is blocked immovably or rigidly when the hydraulic connections 10 and 14 are shut off ("hydrostatic"). In the exemplary embodiment illustrated, the actuator is symbolized by a piston rod 16 which, for steering actuation, engages on a steering linkage or the like of the wheels 4 of the steering axle 2.

A first chamber 9 of the piston/cylinder assembly 18 cooperates, via the first hydraulic connection 10 and a first hydraulic line 11, with a hydraulic arrangement 12 which is symbolized in FIG. 1 as a rectangle. A second chamber 13 of the piston/cylinder assembly 18 is likewise connected, via its second hydraulic connection 14 and via a second hydraulic line 15, to the hydraulic arrangement 12.

According to FIG. 2, the first hydraulic line 11 is connected to a first connection 17a of a regulating/control valve 17 which, in the exemplary embodiment, is designed as a proportional valve. The second hydraulic line 15 is connected to a second connection 17b of the proportional valve 17. Moreover, the hydraulic lines 11 and 15 are connected to a clearing valve 19. In this case, a first clearing line 20 connects a first connection 19a of the clearing valve 19 to the first hydraulic line 11 at a first connection point 21. Furthermore, a second clearing line 22 connects the second hydraulic line 15 to a second connection 19b of the clearing valve 19 at a second connection point 23.

The clearing valve 19 has two positions, I and II. In its position II its connections 19a and 19b being connected to one another, so that the hydraulic lines 11 and 15 are short-circuited via the clearing lines 20 and 22. When the clearing valve 19 is in the position I, its connections 19a and 19b are in each case shut off. Position I is assigned to the normal operation of the steering device 3 and position II to the emergency operation of the latter.

The proportional valve 17 has a third connection 17c, to which is connected a pressure accumulator 24 which is fed from a hydraulic medium reservoir 26 via a hydraulic medium pump 25. A fourth connection 17d of the proportional valve 17 is connected to the reservoir 26 via a filter 27.

The proportional valve 17 has three different switching states I, II and III. In switching state I, all the connections 17a to 17d of the proportional valve 17 are shut off. This is therefore a so-called closed-center arrangement, in which, in switching state I of the proportional valve 17, the connection 17c connected to the pressure source (pressure accumulator 24 and pump 25) is shut off when there is no deviation between the desired and the actual steering angle. Moreover, in the embodiment shown, the connections 17a and 17b are shut off, so that the piston rod 16 of the piston/cylinder assembly 18 is locked hydraulically in its middle position.

In switching state II, the connection 17a is connected to the connection 17c and the connection 17b to the connection 17d, with the result that pressure acts upon the first chamber 9 of the piston/cylinder assembly 18, while the second chamber 13 can be emptied into the reservoir 26, the piston rod 16 being adjustable to the right according to FIG. 2. In switching state III of the proportional valve 17, the connection 17a is connected to the connection 17d and the connection 17b to the connection 17c, with the result that pressure from the pressure accumulator 24 acts upon the second chamber 13, while the chamber 9 can be emptied into the reservoir 26, the piston rod 16 being adjustable to the left according to FIG. 2.

The switching states II and III are in each case switching ranges, in which the switching states described occur with throughflow cross sections opened to a greater or lesser extent, depending on the activation or modulation of the proportional valve 17, that is to say the flow through the proportional valve 17 takes place with a greater or lesser throttle resistance, depending on the selected degree of modulation within the respective switching state II or III A first throttle element 28 is arranged in the first hydraulic line 11 between the piston/cylinder assembly 18 and the first connection point 21 of the clearing valve 19. A second throttle element 29 is likewise arranged in the first hydraulic line 11 between the first connection point 21 of the clearing valve 19 and the regulating/control valve 17. A third throttle element 30 is arranged in the second hydraulic line 15 between the piston/cylinder assembly 18 and the second connection point 23 of the clearing valve 19. A fourth throttle element 31 is likewise arranged in the second hydraulic line 15 between the second connection point 23 of the clearing valve 19 and the regulating/control valve 17.

The arrangement according to the invention of the four throttle elements 28, 29, 30 and 31 improves the operating behaviour of the hydraulic arrangement 12 and therefore of the steering device 2 according to the invention in many ways, with the result that vehicle safety is increased both in normal operation and in emergency operation.

In normal operation, that is to say when the clearing valve is switched into its position I, a broad modulating range of the proportional valve 17 can be utilized, thereby increasing the resolution or fineness with which desired adjustment travels and adjustment speeds for the piston rod 16 of the piston/cylinder assembly 18 can be implemented. This is attributable to the fact that, in order to achieve the flow velocity necessary in each case in the hydraulic lines 11 and 15, because of the throttles 28, 29 or 30, 31 arranged in them and of the associated increased flow resistance, the proportional valve 17 must be modulated in the direction of larger opening cross sections and therefore within a broader control range.

On the other hand, the throttle elements 28, 29 30 and 31 arranged according to the invention give rise to the situation where, in emergency operation, that is to say when the clearing valve 19 is switched into its position II, an exchange of hydraulic medium between the chambers 9 and 13 of the piston/cylinder assembly 18 can take place only in a throttled manner. This causes a damping of lateral forces applied from outside to the wheels 4 cooperating with the piston road 16, with result that the emergency running property of the respective wheels 4 is improved considerably.

When an emergency arises, in which the proportional valve 17 is blocked in one of its states II or III, the pressure accumulator 24 can be discharged into the reservoir 26 via the hydraulic lines 11 and 15 which are short-circuited as a result of the position II of the clearing valve 19. The flow through the clearing valve and the proportional valve, which is formed at the same time, results, because of prevailing flow losses or flow resistances at these valves, in pressure drops in the hydraulic flow. In a conventional steering device without the throttle elements 28, 29, 30 and 31 proposed according to the invention, these pressure drops may lead to pronounced pressure differences between the connections 19a and 19b of the clearing valve 19 which are propagated to the hydraulic connections 10 and 14 of the piston/cylinder assembly 18. The piston rod 16 of the piston/cylinder assembly 18 may thereby exert a steering force on the affected wheels 4. Unintentional steering of this kind may therefore lead to critical driving situations in the case of conventional steering devices. By virtue of the arrangement of the throttle elements 28, 29, 30 and 31 which is proposed according to the invention, the discharge of the pressure accumulator 34 takes place counter to greater throttle resistances, so that the discharge of the pressure accumulator 24 by means of the proportional valve 17 and the clearing valve 19 takes place more slowly, with lower flow velocities, as a result of which the pressure difference building up between the hydraulic connections 10 and 14 of the piston/cylinder assembly 18 is markedly lower. At the same time, the steering force which is then also formed is usually too low to produce dangerous driving situations and, in the most favourable case, is even too low to bring about a steering movement on the corresponding wheels 4.

What is claimed is:

1. A steering device for steering wheels of a steering axle of a motor vehicle having at least three axles, said steering axle being designed as a trailing or leading axle and comprising:

a hydraulic arrangement for steering actuation of the wheels of the steering axle, and an electronic arrangement associated with the hydraulic arrangement, the electronic arrangement comprising means for monitoring functions of the steering device and, in an emergency, means for effecting a change-over of the steering device from a normal operation to an emergency operation, the steering axle comprising wheels that are self-tracking in the emergency operation, the hydraulic arrangement comprising a double-acting hydrostatic actuating assembly, a regulating/control valve and a clearing valve, a first hydraulic connection of the actuating assembly being assigned to one actuating direction of the actuating assembly, and connected by a first hydraulic line to a first connection of the regulating/control valve, and a second hydraulic connection of the actuating assembly being assigned to the other actuating direction of the actuating assembly and connected by a second hydraulic line to a second connection of the regulating/control valve, a first connection of the clearing valve being connected to the first hydraulic line and a second connection of the clearing valve being connected to the second hydraulic line, such that when the clearing valve is in a first position assigned to the normal operation of the steering device, both connections of the clearing valve are shut off, and when the clearing valve is in a second position assigned to the emergency operation of the steering device, both connections of the clearing valve are connected to one another, a first throttle element arranged in the first hydraulic line between the actuating assembly and a connection point of the clearing valve which is assigned to the first hydraulic line, a second throttle element arranged in the first hydraulic line between the regulating/control valve and the connection point of the clearing valve which is assigned to the first hydraulic line, a third throttle element arranged in the second hydraulic line between the actuating assembly and a connection point of the clearing valve which is assigned to the second hydraulic line, and a fourth throttle element arranged in the second hydraulic line between the regulating/control valve and the connection point of the clearing valve which is assigned to the second hydraulic line.

2. The steering device according to claim 1, wherein the hydraulic arrangement comprises an open-center arrangement, in which the regulating/control valve connects all its connections to one another when there is no control deviation between a desired and an actual steering angle.

3. The steering device according to claim 1, wherein the hydraulic arrangement comprises a closed-center arrangement, in which the regulating/control valve, in one position, shuts off a connection to which a hydraulic pressure source is connected, when there is no control deviation between a desired and an actual steering angle.

4. The steering device according to claim 3, wherein the hydraulic arrangement comprises a pressure accumulator which is charged by a hydraulic pump.

5. The steering device according to claim 1, wherein the actuating assembly is designed as a piston/cylinder assembly.

6. The steering device according to claim 1, wherein the case of an at least three-axle motor vehicle with at least one front axle having steerable wheels and with at least one rear axle having non-steerable wheels, the steering axle having the wheels steerable by means of the steering device is designed as a trailing axle or as a leading axle of the rear axle or as a further steered front axle.

7. A steering device configured to steer wheels of a steering axle of a motor vehicle including at least three axles, the steering axle configured as one of a trailing axle and a leading axle, comprising:

a hydraulic arrangement configured to actuate steering of the wheels of the steering axle, the hydraulic arrangement including a double-acting hydrostatic actuating assembly, a regulating/control valve and a clearing valve; and an electronic arrangement associated with the hydraulic arrangement, the electronic arrangement including an arrangement configured to monitor functions of the steering device and, in an emergency, an arrangement configured to effect a change-over of the steering device from a normal operation to an emergency operation, the steering axle including wheels that are self-tracking in the emergency operation;

wherein a first hydraulic connection of the actuating assembly is assigned to a first actuating direction of the actuating assembly and connected by a first hydraulic line to a first connection of the regulating/control valve;

wherein a second hydraulic connection of the actuating assembly is assigned to a second actuating direction of the actuating assembly and connected by a second hydraulic line to a second connection of the regulating/control valve;

wherein a first connection of the clearing valve is connected to the first hydraulic line and a second connection of the clearing valve is connected to the second hydraulic line;

wherein the first connection and the second connection of the clearing valve are shut off when the clearing valve is in a first position assigned to the normal operation of the steering device and the first connection and the second connection of the clearing valve are connected to one another when the clearing valve is in a second position assigned to the emergency operation of the steering device;

wherein a first throttle element is arranged in the first hydraulic line between the actuating assembly and a connection point of the clearing valve assigned to the first hydraulic line;

wherein a second throttle element is arranged in the first hydraulic line between the regulating/control valve and the connection point of the clearing valve assigned to the first hydraulic line;

wherein a third throttle element is arranged in the second hydraulic line between the actuating assembly and a connection point of the clearing valve assigned to the second hydraulic line; and wherein a fourth throttle element is arranged in the second hydraulic line between the regulating/control valve and the connection point of the clearing valve assigned to the second hydraulic line.

8. The steering device according to claim 7, wherein the hydraulic arrangement includes an open-center arrangement, in which the regulating/control valve connects all its connections to one another when there is no control deviation between a desired and an actual steering angle.

9. The steering device according to claim 7, wherein the hydraulic arrangement includes a closed-center arrangement, in which the regulating/control valve, in one position, shuts off a connection to which a hydraulic pressure source is connected, when there is no control deviation between a desired and an actual steering angle.

10. The steering device according to claim 9, wherein the hydraulic arrangement includes a pressure accumulator charged by a hydraulic pump.

11. The steering device according to claim 7, wherein the actuating assembly includes a piston/cylinder assembly.

12. The steering device according to claim 7, wherein the case of an at least three-axle motor vehicle with at least one front axle having steerable wheels and with at least one rear axle having non-steerable wheels, the steering axle having the wheels steerable by the steering device is configured as one a trailing axle of the rear axle, a leading axle of the rear axle and as a further steered front axle.

* * * * *